United States Patent
Lobban

(10) Patent No.: US 9,056,717 B2
(45) Date of Patent: Jun. 16, 2015

(54) WASTE COLLECTION SYSTEM

(71) Applicant: Graham Lobban, St. Clements (CA)

(72) Inventor: Graham Lobban, St. Clements (CA)

(73) Assignees: RTS Companies Inc., St. Clements (CA); Brubacher Properties Inc., Waterloo, Ontario (CA); 2234220 Ontario Inc., Kitchener, Ontario (CA)

( * ) Notice: Subject to any disclaimer, the term of this patent is extended or adjusted under 35 U.S.C. 154(b) by 239 days.

(21) Appl. No.: 13/896,385

(22) Filed: May 17, 2013

(65) Prior Publication Data

US 2014/0158692 A1   Jun. 12, 2014

Related U.S. Application Data

(60) Provisional application No. 61/736,161, filed on Dec. 12, 2012.

(51) Int. Cl.
| | | |
|---|---|---|
| B65F 1/14 | (2006.01) | |
| B65F 1/12 | (2006.01) | |
| B65F 1/02 | (2006.01) | |

(52) U.S. Cl.
CPC .............. B65F 1/1447 (2013.01); B65F 1/02 (2013.01); B65F 1/122 (2013.01); B65F 1/1607 (2013.01); B65F 1/1615 (2013.01); B65F 2240/156 (2013.01); B65F 2240/1564 (2013.01); B65F 2250/1143 (2013.01)

(58) Field of Classification Search
CPC ........ B65F 1/1447; B65F 1/1423; B65F 1/14; B65F 1/068; B65F 1/06; B65F 1/04; B65F 1/08; B65F 1/1457; B65F 1/1452; B65D 88/76; B65D 90/105

USPC .............. 220/484, 567.1, 908.1, 908, 495.06, 220/495.01; 166/162; 414/403
See application file for complete search history.

(56) References Cited

U.S. PATENT DOCUMENTS

| | | | | |
|---|---|---|---|---|
| 607,524 | A | * | 7/1898 | Reed .............................. 220/484 |
| 2,501,762 | A | * | 3/1950 | Davis, Jr. ....................... 220/484 |
| 3,669,485 | A | | 6/1972 | Stihler |
| 4,550,849 | A | | 11/1985 | Adsit |
| 4,570,812 | A | * | 2/1986 | Curtis ............................ 220/484 |
| 4,726,616 | A | | 2/1988 | Schmidt |
| 5,183,180 | A | | 2/1993 | Hawkins et al. |
| 5,238,356 | A | * | 8/1993 | Salli .............................. 414/403 |

(Continued)

FOREIGN PATENT DOCUMENTS

| | | |
|---|---|---|
| CA | 2535274 | 8/2006 |
| CA | 2605909 | 4/2008 |

(Continued)

*Primary Examiner* — Robert J Hicks

(57) ABSTRACT

A waste collection system including a well assembly positioned at least partially below a reference surface, the well assembly having a base and a well wall at least partially positioned on the base. The well assembly also includes a well liner defining a liner cavity therein, positioned in a well defined in part by the well wall. The system also includes a main receptacle body having a main barrel portion and a head portion, the main receptacle body being at least partially receivable in the liner cavity, and the main receptacle body being movable by a moving device between a received condition, in which the main barrel portion is at least partially received in the liner cavity, and a removed condition, in which the main barrel portion is located outside the liner cavity. The main receptacle body defines a cavity therein in which waste is receivable.

25 Claims, 17 Drawing Sheets

(56) References Cited

U.S. PATENT DOCUMENTS

| | | |
|---|---|---|
| 5,330,071 A | 7/1994 | Parker |
| 5,423,448 A | 6/1995 | Pedigo |
| 7,198,166 B2 | 4/2007 | Sholinder |
| 7,237,689 B2 | 7/2007 | Maggio, Sr. et al. |
| 7,540,393 B2 | 6/2009 | Wong |
| 7,762,565 B2 | 7/2010 | Hatamian et al. |
| 7,988,009 B2 | 8/2011 | Cavalcante |
| 8,141,921 B2 | 3/2012 | Apps et al. |
| 2012/0043327 A1 | 2/2012 | Baltz et al. |
| 2012/0055834 A1 | 3/2012 | Hay et al. |
| 2012/0132662 A1 | 5/2012 | Apps et al. |
| 2012/0181214 A1 | 7/2012 | Kernen et al. |

FOREIGN PATENT DOCUMENTS

| | | |
|---|---|---|
| CA | 2505582 | 7/2009 |
| CA | 2621647 | 7/2009 |
| CA | 2650110 | 7/2009 |
| CA | 2713332 | 2/2011 |
| CA | 2746398 | 1/2012 |
| CA | 2750314 | 2/2012 |

* cited by examiner

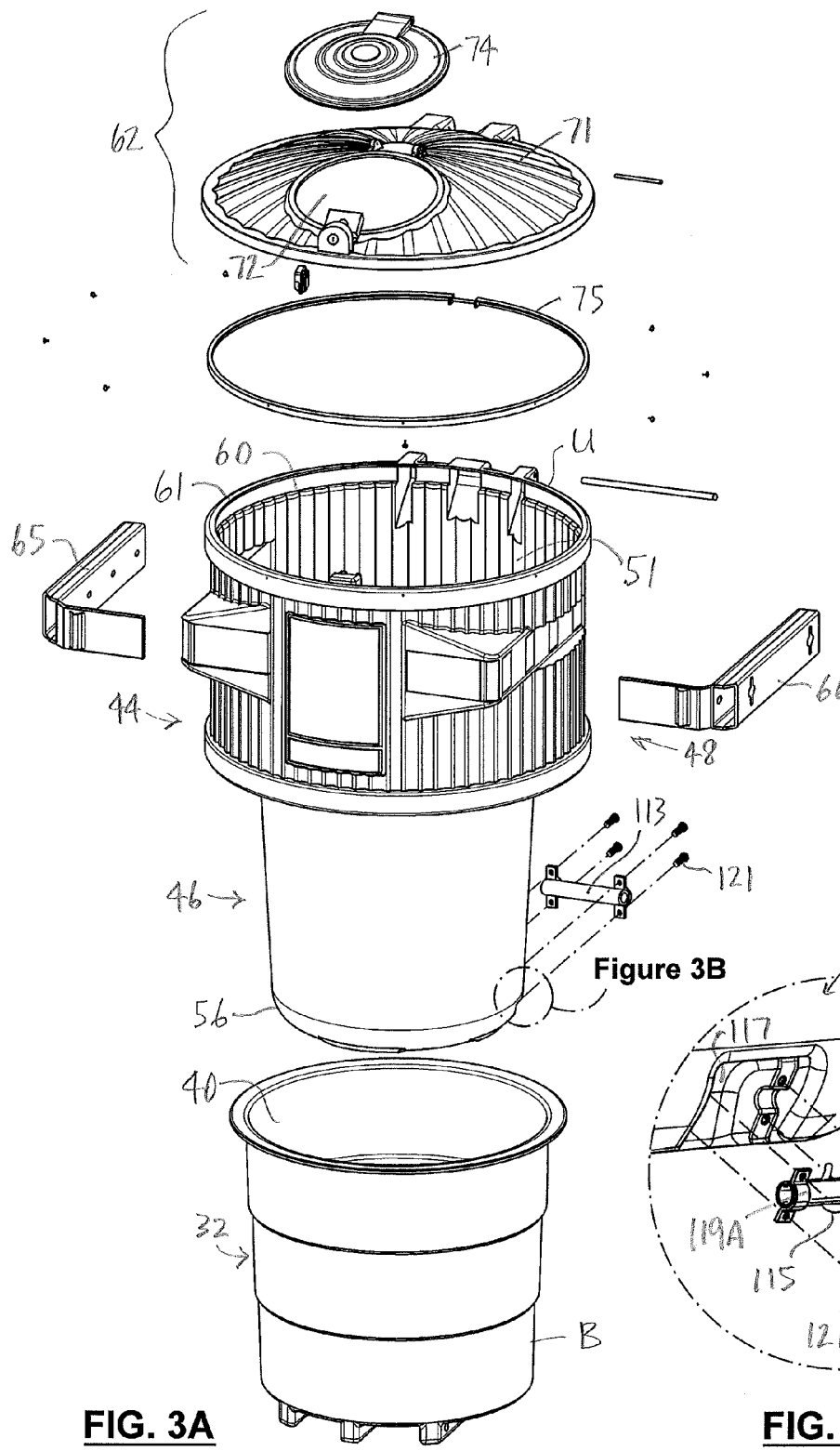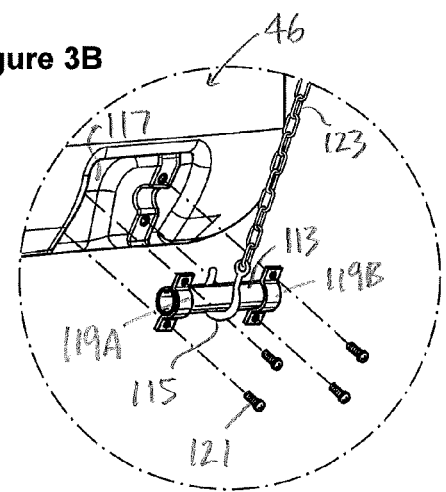
FIG. 3A
FIG. 3B

US 9,056,717 B2

WASTE COLLECTION SYSTEM

This application claims the benefit of U.S. Provisional Patent Application No. 61/736,161, filed Dec. 12, 2012, the disclosure of which is incorporated fully herein by reference.

FIELD OF THE INVENTION

This invention is related to a waste collection system including a main receptacle body with a cavity therein in which waste is receivable.

BACKGROUND OF THE INVENTION

Many different waste collection systems are known. However, the known waste collection systems have a number of disadvantages.

For instance, the conventional dumpster is a large metal box that sits on the ground. The conventional dumpster has the advantage that emptying it, using a front-end-loading waste disposal truck (as is well known in the art), is relatively easy. However, a user typically must lift the waste up relatively high in order to put it into the dumpster, and in some cases, a stairway or ladder is required. Also, controlling access to the dumpster's interior may be difficult, and if such control is not exercised, unauthorized large waste items (e.g., furniture) may be discarded in the dumpster. In effect, this unauthorized dumping transfers the cost of disposing of the unauthorized waste items onto the party responsible for the dumpster.

In addition, because the conventional dumpster is metal, it may become dented and rusty over time.

SUMMARY OF THE INVENTION

For the foregoing reasons, there is a need for a waste collection system that overcomes or mitigates one or more of the disadvantages of the prior art.

In its broad aspect, the invention provides a waste collection system including a well assembly positioned at least partially below a reference surface. The well assembly includes a base, and a well wall at least partially positioned on the base. The base and the well wall at least partially define a well, the well wall being at least partially permeable to permit liquid collected in the well to drain therefrom through the well wall. The well assembly also includes a well liner at least partially receivable in the well, the well liner having a body extending between top and bottom ends thereof, the body defining a liner cavity therein in communication with a top opening at the top end. The waste collection system additionally includes a main receptacle body having a main barrel portion and a head portion, the main receptacle body being at least partially receivable in the liner cavity. The main receptacle body is movable by one or more moving devices between a received condition, in which the main barrel portion is at least partially received in the liner cavity, and a removed condition, in which the main barrel portion is located outside the liner cavity. The main receptacle body defines a cavity therein in which waste is receivable.

In another of its aspects, the head portion additionally includes a pair of sleeves located thereon, the pair of said sleeves being positioned for receiving therein forks mounted on the moving device when the main receptacle body is in the received condition, to permit the main receptacle body to be moved between the received condition and the removed condition by the moving device.

In yet another of its aspects, the invention provides a well assembly for at least partially receiving a main barrel portion of a main receptacle body in which waste is collectable for disposal therefrom. The well assembly includes a base, and a well wall having one or more materials that are at least partially permeable, for drainage therethrough. The well wall and the base at least partially define a well in which the main barrel portion is at least partially receivable. The well assembly also includes a well liner at least partially receivable in the well. The well liner has a body extending between top and bottom ends thereof defining a liner cavity therein in communication with a top opening at the top end. The liner cavity is formed to at least partially receive the main barrel portion.

BRIEF DESCRIPTION OF THE DRAWINGS

The invention will be better understood with reference to the attached drawings, in which:

FIG. 3A is an exploded isometric view of the main receptacle body, the well body, and the lid subassembly, drawn at a smaller scale;

FIG. 3B is an exploded isometric view of an embodiment of a tip bar of the invention and brackets therefor, drawn at a larger scale;

DETAILED DESCRIPTION

Figure 1A:
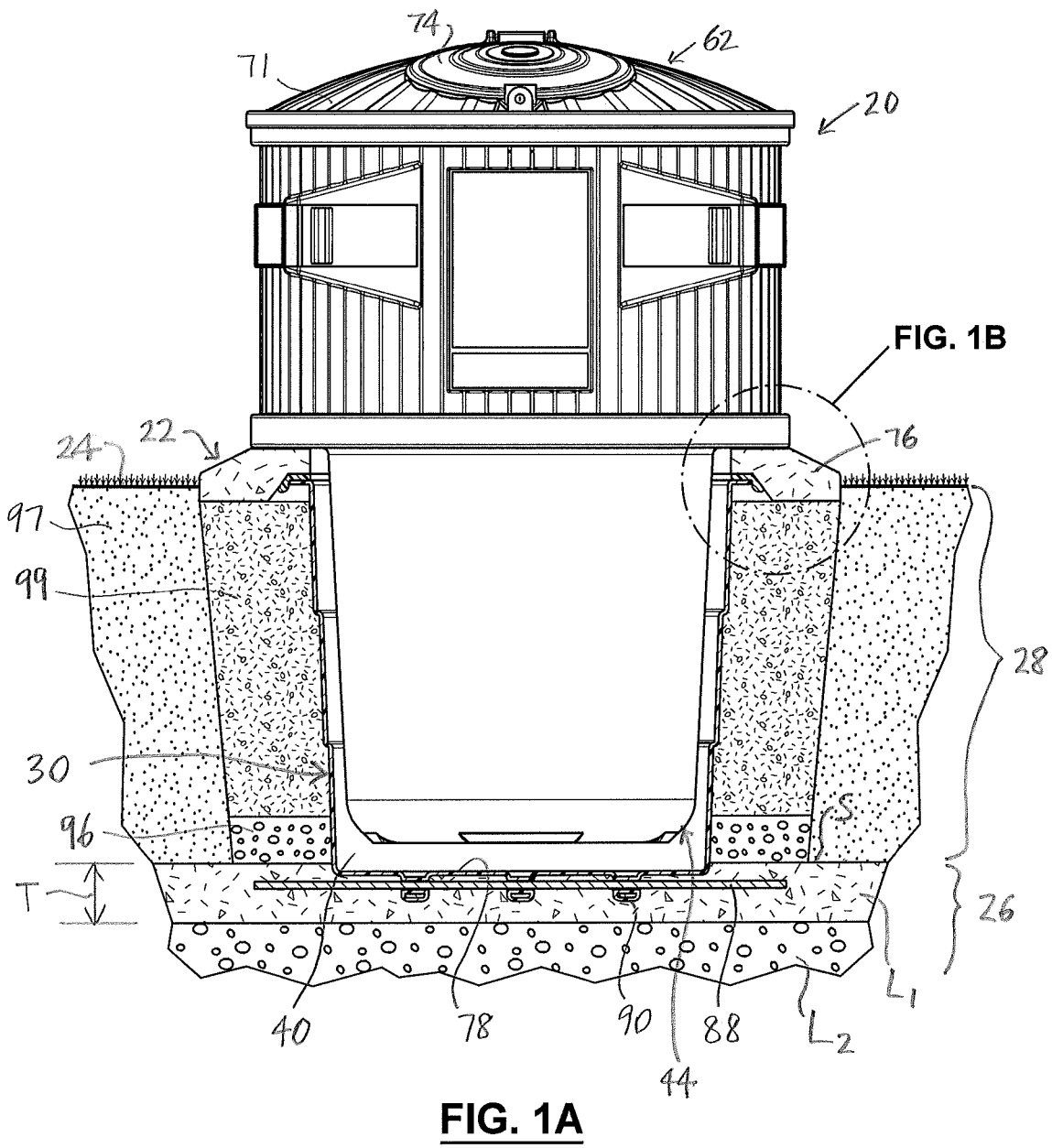
FIG. 1A is a partial cross-section of an embodiment of a waste collection system of the invention including a main receptacle body, a well body, and a lid subassembly.
Figure 4A:
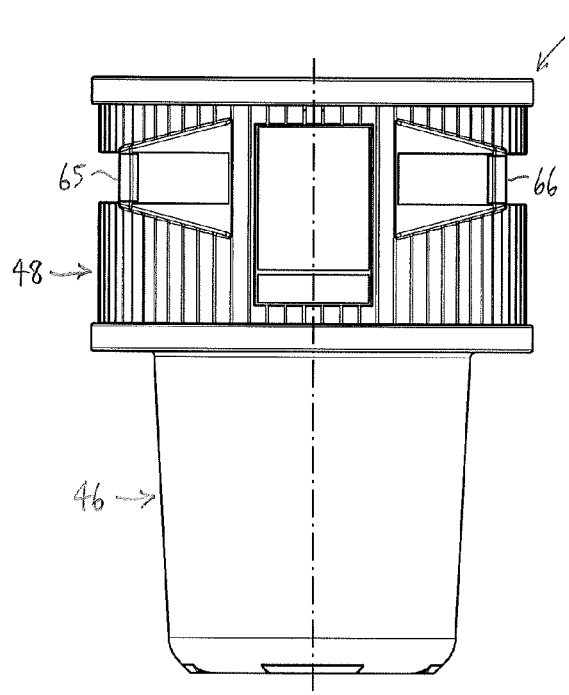
FIG. 4A is a front view of the main receptacle body, drawn at a smaller scale.
Figure 4C:
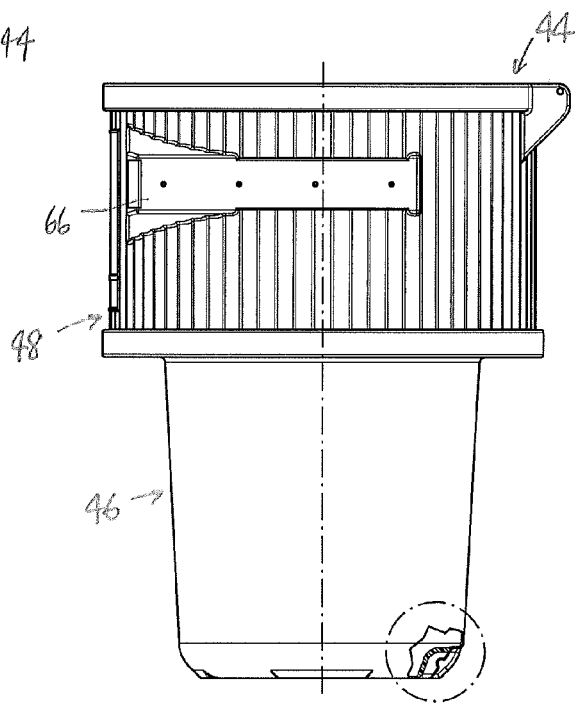
FIG. 4C is a side view of the main receptacle body, with a part partially cut away to show a recess.
Figure 4B:
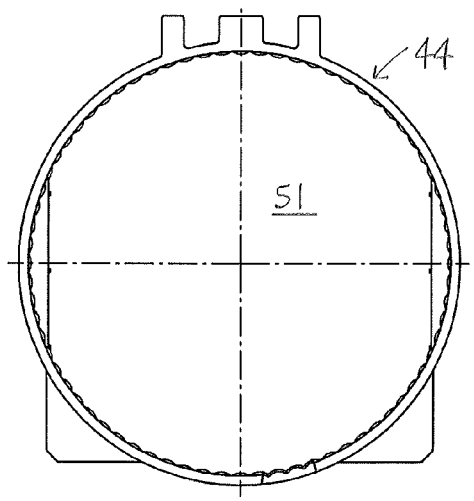
FIG. 4B is a top view of the main receptacle body.
Figure 4D:
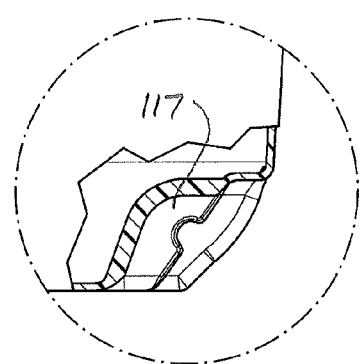
FIG. 4D is a partial cross-section of the main receptacle body of FIG. 4C showing the recess, in which the tip bar is mounted, drawn at a larger scale.
Figure 5A:
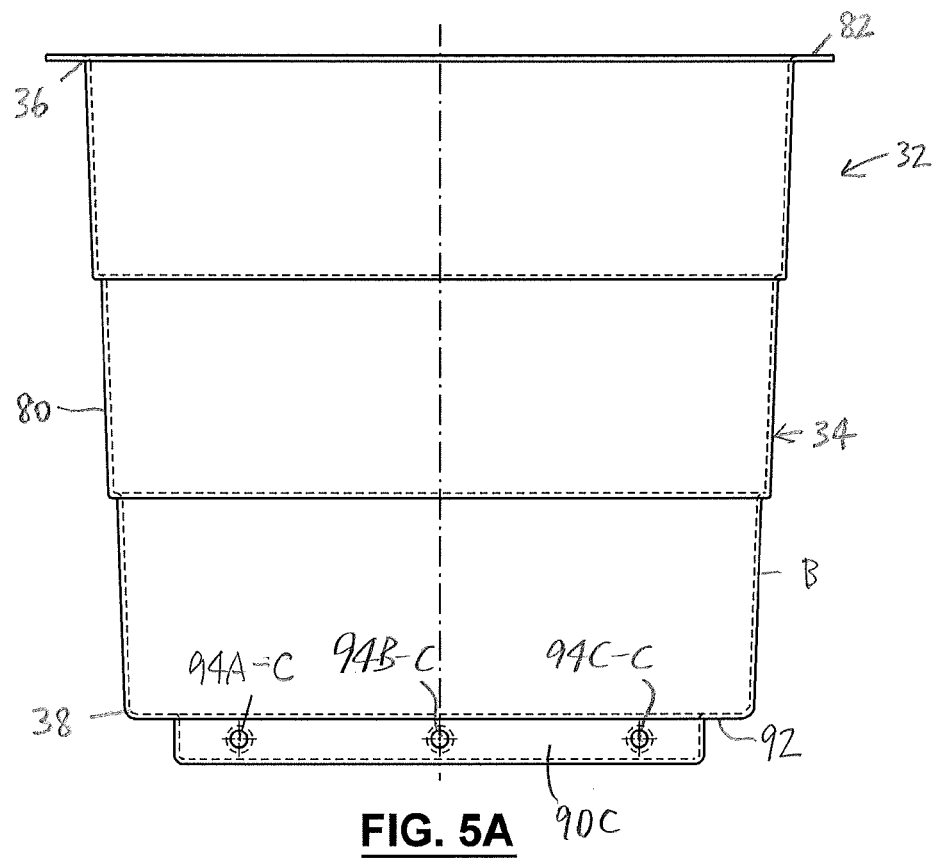
FIG. 5A is a side view of the well body, drawn at a smaller scale.
Figure 5B:
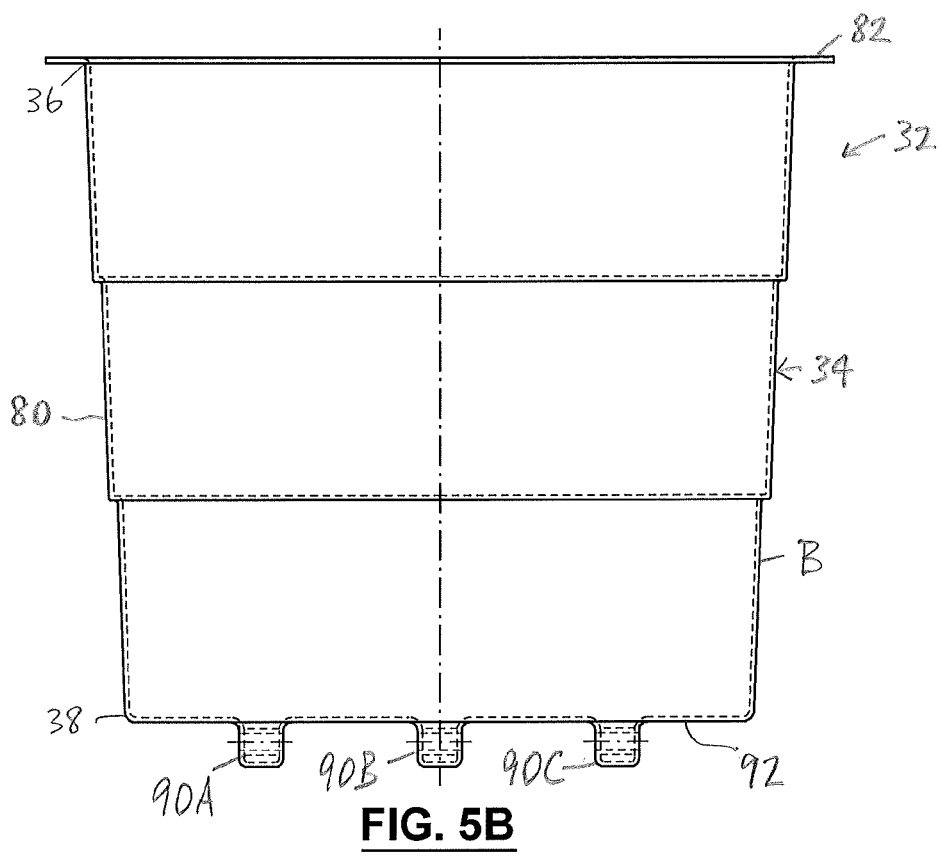
FIG. 5B is a front view of the well body.

In the attached drawings, like reference numerals designate corresponding elements throughout. Reference is first made to FIGS. 1A-6B, 10, and 11 to describe an embodiment of a waste collection system of the invention referred to generally by the numeral 20. In one embodiment, the waste collection system 20 preferably includes a well assembly 22 positioned at least partially below a reference surface 24 (FIGS. 1A, 1C). It is preferred that the well assembly 22 includes a base 26 and a well wall 28 at least partially positioned on the base 26. Preferably, and as can be seen in FIGS. 1A and 1C, the base 26 and the well wall 28 at least partially define a well 30 (FIGS. 1A, 1C). As will be described, the well wall 28 is at least partially permeable to permit liquid collected in the well 30 to drain therefrom through the well wall 28. In one embodiment, the well assembly 22 preferably also includes a well liner 32 at least partially receivable in the well 30. The well liner 32 preferably includes one or more bodies 34 extending between top and bottom ends 36, 38 thereof (FIGS. 5A, 5B). Preferably, the body 34 defines a liner cavity 40 therein (FIGS. 1A, 1C, 3A) in communication with a top opening 42 (FIG. 3A) of the liner body 34 at the top end 36. It is also preferred that the waste collection system 20 includes a main receptacle body 44 (FIGS. 1A, 1C) having a main barrel portion 46 and a head portion 48 (FIGS. 2A, 2B, 2C), the main receptacle body 44 being at least partially receivable in the liner cavity 40. As will also be described, the main receptacle body 44 preferably is movable by one or more moving devices 50 (FIG. 2D) between a received condition (FIGS. 1A, 1C), in which the main barrel portion 46 is at least partially received in the liner cavity 40, and a removed condition (FIG. 2A), in which the main barrel portion 46 is located outside the liner cavity 40. As can be seen in FIG. 2C, the main receptacle body 44 preferably defines a cavity 51 therein in which waste is receivable.

Figure 2A:
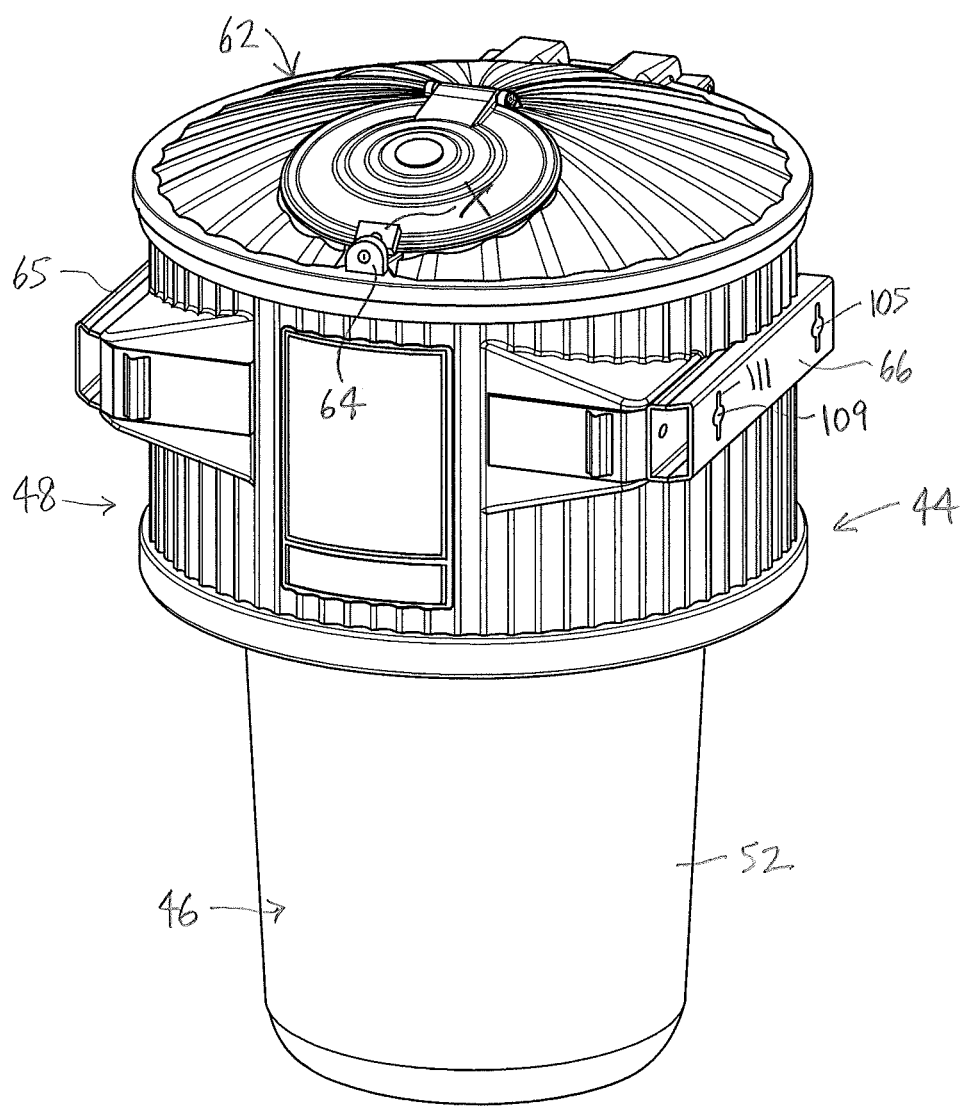
FIG. 2A is an isometric view of the main receptacle body of FIG. 1A partially received in an embodiment of a well body of the invention with the lid subassembly of FIG. 1A mounted on the main receptacle body, drawn at a smaller scale.
Figure 2B:
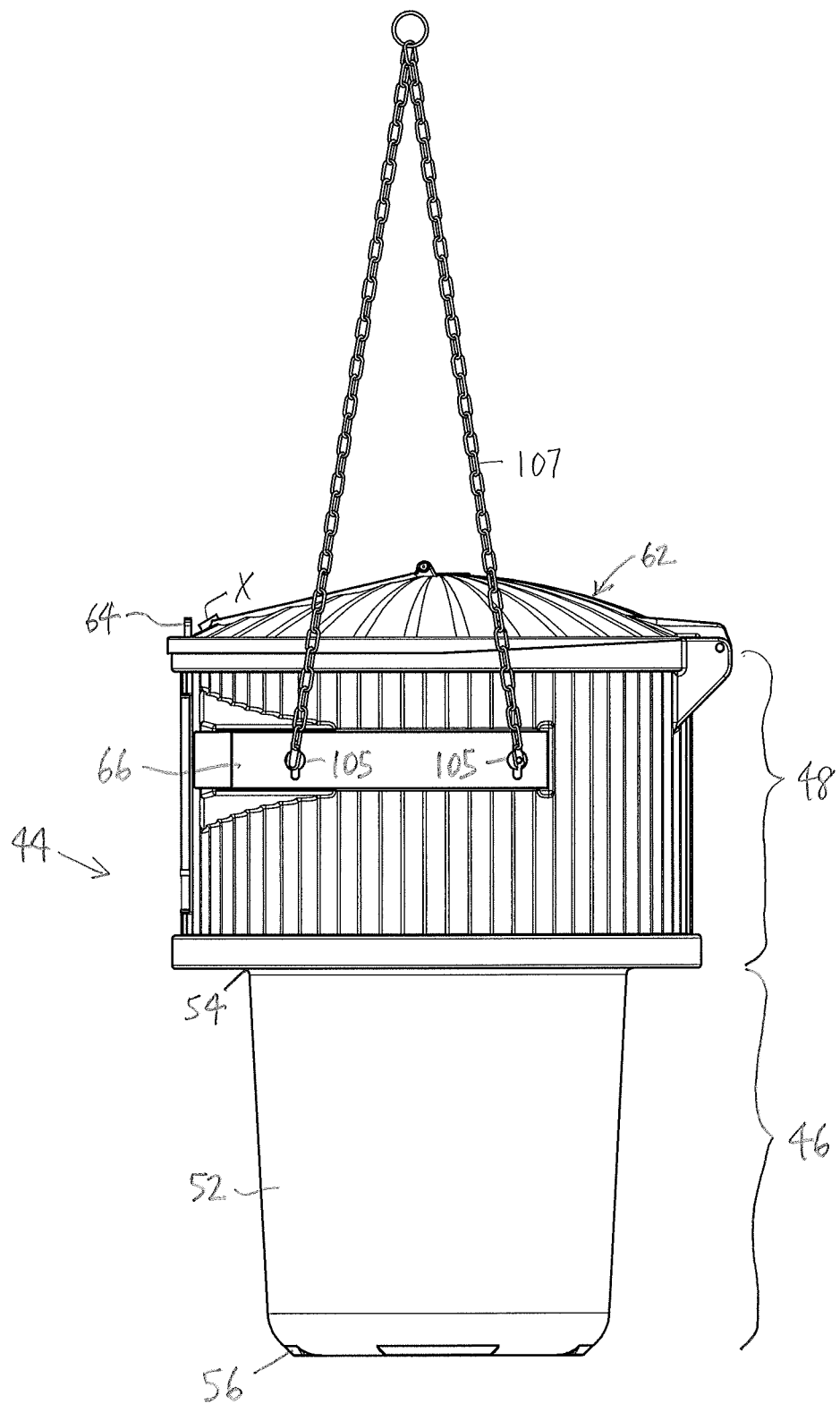
FIG. 2B is a side view of the main receptacle body, of the well body, and the lid subassembly of FIG. 2A.

Preferably, and as can be seen in FIGS. 2A-2C, the main barrel portion 46 includes one or more walls 52 extending between upper and lower ends 54, 56 thereof and defining a lower part 58 of the cavity 51 therein.

In one embodiment, the head portion 48 defines an opening 60 therein at a top end 61 thereof in communication with the cavity 51 (FIG. 3A). It is also preferred that the main receptacle body 44 additionally includes a lid subassembly 62 positionable to cover the opening 60, to provide controllable access to the opening 60.

Figure 1C:
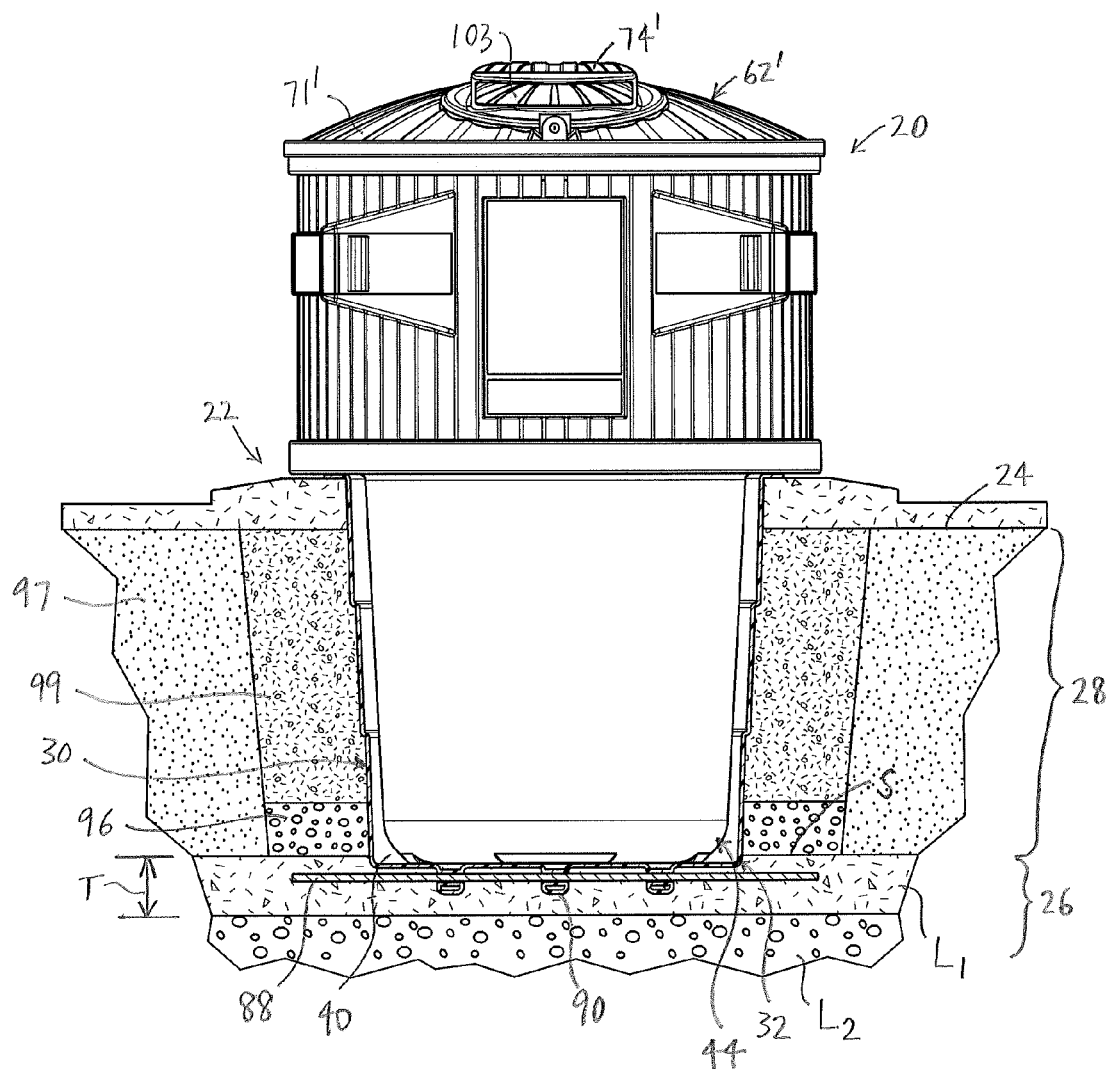
FIG. 1C is a partial cross-section of an alternative embodiment of the waste collection system of the invention, drawn at a smaller scale.
Figure 2C:
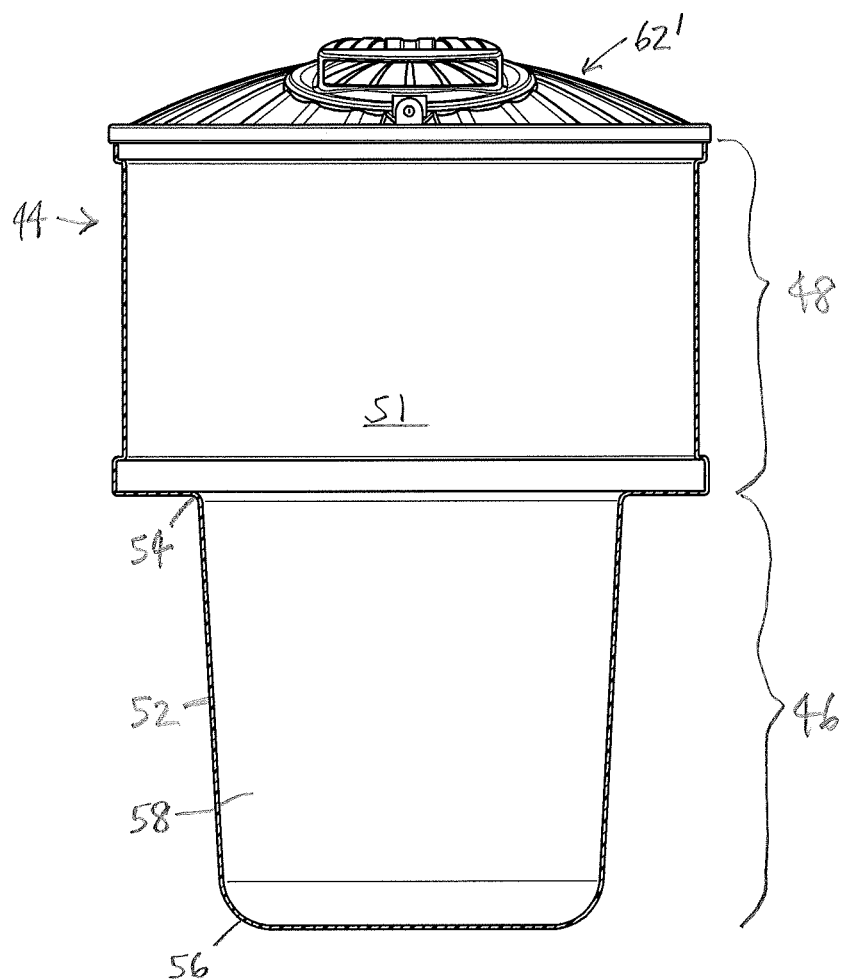
FIG. 2C is a front view of the main receptacle body and the lid subassembly of FIG. 2A, with the well body cut partially away.
Figure 2D:
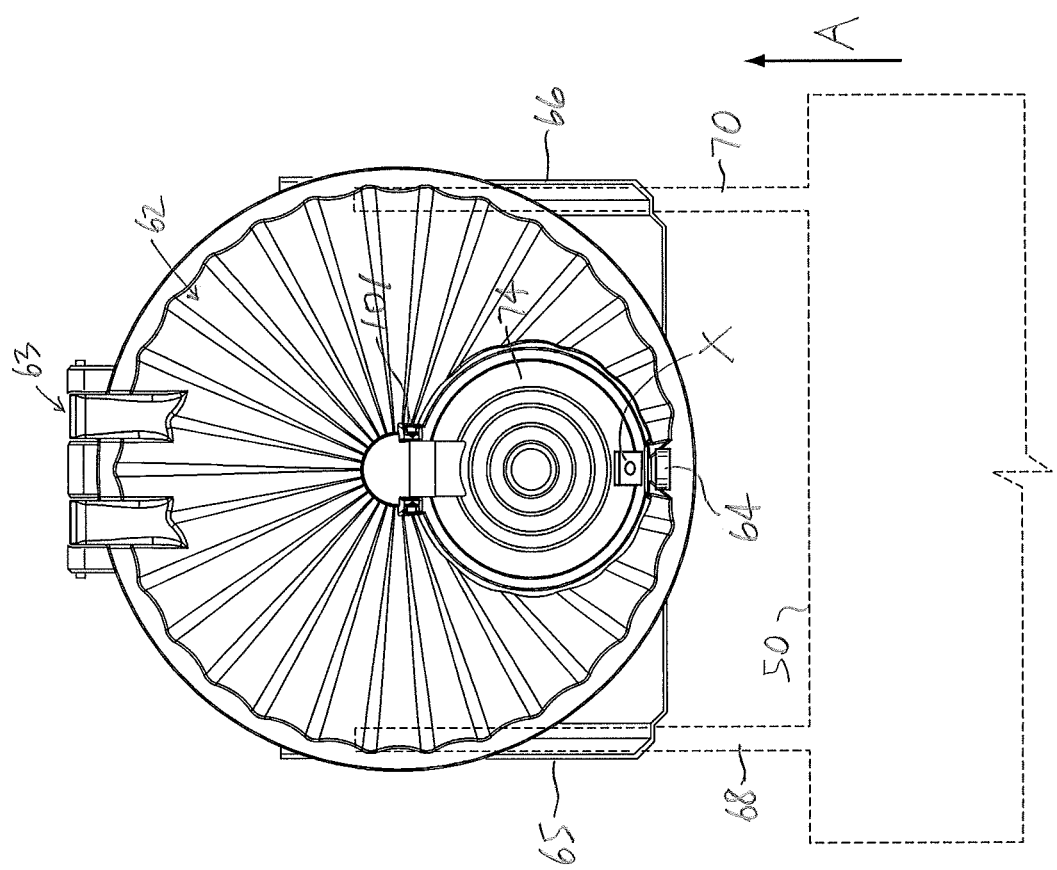
FIG. 2D is a top view of the main receptacle body of FIG. 1A.

As can be seen in FIG. 2D, the main receptacle body 44 preferably also includes a hinge subassembly 63 that pivotably connects the lid subassembly 62 and the head portion 48. Preferably, the lid subassembly 62 remains in a closed position, i.e., covering the opening 60, while the main receptacle body 44 is held substantially upright, i.e., in the position as shown in FIG. 1A and 1C. It is also preferred that the main receptacle body 44 additionally includes a gravity lock 64 (FIGS. 2A, 2D) to hold the lid subassembly 62 in the closed position (i.e., covering the opening 60), until the main receptacle body 44 is in the removed condition and moved to a position thereof in which the gravity lock is located at a predetermined unlock position, e.g., at greater than 90° to the horizontal. As is known, when the gravity lock is in the predetermined unlock position thereof, it opens due to the influence of gravity, thereby permitting the lid subassembly 62 to swing open, pivoting on the hinge subassembly 63. When the main receptacle body 44 is in this position, the waste collected in the cavity 51 is emptied out, as will be described. After the collected waste has exited the cavity 51, when the main receptacle body 44 is brought to a substantially vertical position with the top end 61 upright, the gravity lock locks itself, also due to the influence of gravity. Because gravity locks are known in the art, further description thereof is unnecessary.

Preferably, when the main receptacle body 44 is to be emptied of the waste that has collected inside the cavity 51, the main receptacle body 44 is lifted by the moving device 50, to remove the main barrel portion 46 from the liner cavity 40. That is, the moving device 50 moves the main receptacle body 44 from the received condition to the removed condition. After the main barrel portion 46 is removed from the liner cavity 40 (i.e., while the main receptacle body 44 is in the removed condition), the main receptacle body 44 is upended, or at least partially inverted (i.e., so that the opening 60 is at least partially lower than the lower end 56) to cause the gravity lock to open as described above, and to cause the waste to be removed from the cavity 51 under the influence of gravity. The waste preferably is emptied from the cavity 51 into a waste receptacle (not shown) in a garbage truck. After the main receptacle body 44 has been emptied, the main receptacle body 44 preferably is moved to the received condition by the moving device 50. To return the main receptacle body 44 to the received condition, the main barrel portion 46 is substantially aligned with the liner cavity 40, with the main receptacle body 44 positioned upright (i.e., with the lower end 56 positioned downwardly and the top end 61 positioned upwardly), and then the main barrel portion 46 is then lowered to a predetermined position or a preselected position (as the case may be), when it is located at least partially into the liner cavity 40. (The predetermined position and the preselected position of the main barrel portion 46 in the liner cavity 40 are further discussed below.)

Those skilled in the art would appreciate that various types of moving devices may be suitable, and also that the moving device may be connected to the main receptacle body 44 using any appropriate connection means. For instance, in one embodiment, the head portion 48 preferably also includes a pair of sleeves 65, 66 located thereon. The sleeves 65, 66 are formed and positioned for receiving therein forks 68, 70 mounted on one or more moving devices 50 when the main receptacle body 44 is in the received condition, to permit the main receptacle body 44 to be moved between the received condition and the removed condition by the moving device 50. As is well known in the art, the forks 68, 70 are mounted on the front end of a front-end-loading garbage truck. The forks 68, 70 are substantially aligned with the sleeves 65, 66 respectively, and then the moving device 50 (i.e., the garbage truck) moves in the direction indicated by arrow "A" in FIG. 2D to insert the forks 68, 70 in the sleeves 65, 66, as is known in the art. Based on the foregoing, it can be seen that, in one embodiment, the waste collection system 20 preferably is adapted for use with standard front-end-loading garbage trucks.

As can be seen in FIG. 3A, it is also preferred that the lid subassembly 62 includes a lid body 71 and an aperture 72 in the lid body 71, to permit ingress into the cavity 51 via the opening 60, when the main receptacle body 44 is in the received condition. Preferably, the aperture 72 is sized to permit objects (not shown) having up to preselected maximum dimensions therethrough. The lid subassembly 62 preferably also includes a cover 74 for covering the aperture 72. In one embodiment, the cover 74 preferably is pivotably connected to the lid body 71.

As noted above, it is preferred that, when the main receptacle body 44 is in the received condition, the gravity lock is locked. Due to the gravity lock, the lid subassembly 62 cannot be raised, e.g., to permit oversized articles to be positioned in, or partially in, the cavity 51. In addition, it is preferred that the cover 74 is normally secured to the lid body 71 by a suitable lock "X" (FIG. 2D). This would also prevent unauthorized disposal of waste in the cavity 51, i.e., via the aperture 72.

Those skilled in the art would appreciate that the elements of the waste collection system 20 may be made in any suitable fashion, out of any suitable materials. Preferably, the head portion 46 and the main barrel portion 48 are rotationally molded, and formed as one piece of polyethylene, preferably high density polyethylene. It is also preferred that the well liner 32 is made of high density polyethylene, rotationally molded. The lid body 71 and the cover 74 preferably also are molded, and made of high density polyethylene. As is known in the art, the plastic parts of the waste collection system 20 preferably are treated so that they are resistant to chemicals, frost, heat, and UV radiation.

Those skilled in the art would also appreciate that both the main receptacle body 44 and the well liner 32 are subjected to substantial stresses. As noted above, the head portion 46 and the main barrel portion 48 preferably are primarily made of a suitable plastic, formed in a unitary body. In addition, and as can be seen in FIG. 3A, it is preferred that the main receptacle body 44 includes a hoop element 75, which is inserted inside an upper lip (designated "U" in FIG. 3A) to strengthen the head portion 46 at the opening 60. Preferably; the hoop element 75 is made of a suitable material, e.g., a suitable steel.

The well liner body 34 preferably has a "stepped" configuration, i.e., so that the body 34 has a smaller diameter at the bottom end 34, and a progressively larger diameter toward the top end 36. The stepped configuration strengthens the well liner, to provide more resistance to the hoop stress to which the liner body 34 is subjected due to the well wall 28 (i.e., backfilled against an outer surface "B") pressing against the outer surface "B" of the well liner 32.

In one embodiment, the well assembly 22 additionally includes one or more collar elements 76 for positioning the main barrel portion 46 in the predetermined position at least partially in the liner cavity 40 when the main receptacle body is in the received condition. As will be described, it is preferred that, when the main receptacle body is in the predetermined position, most of the main barrel portion 46 (if not substantially all) is located in the liner cavity 40. Preferably, the collar element 76 is made of any suitable material(s). In one embodiment, the collar element 76 preferably is formed of concrete poured on site. For instance, the collar element illustrated in FIGS. 1C and 1D is produced by pouring concrete on site. It will be understood that the collar element 76 forms a ring around the top of the well, on which the well liner is at least partially positionable, as will be described.

Figure 10:
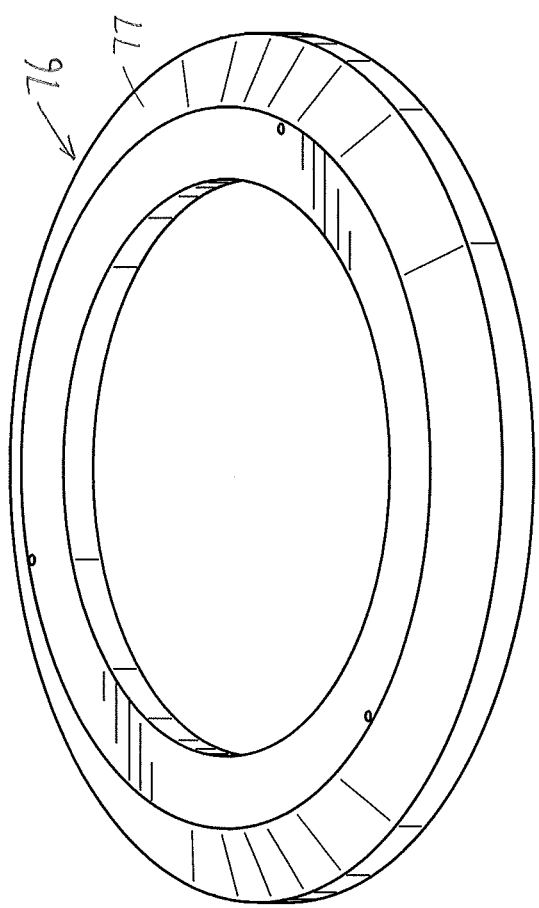
FIG. 10 is an isometric view of a precast concrete ring, drawn at a smaller scale.
Figure 11:
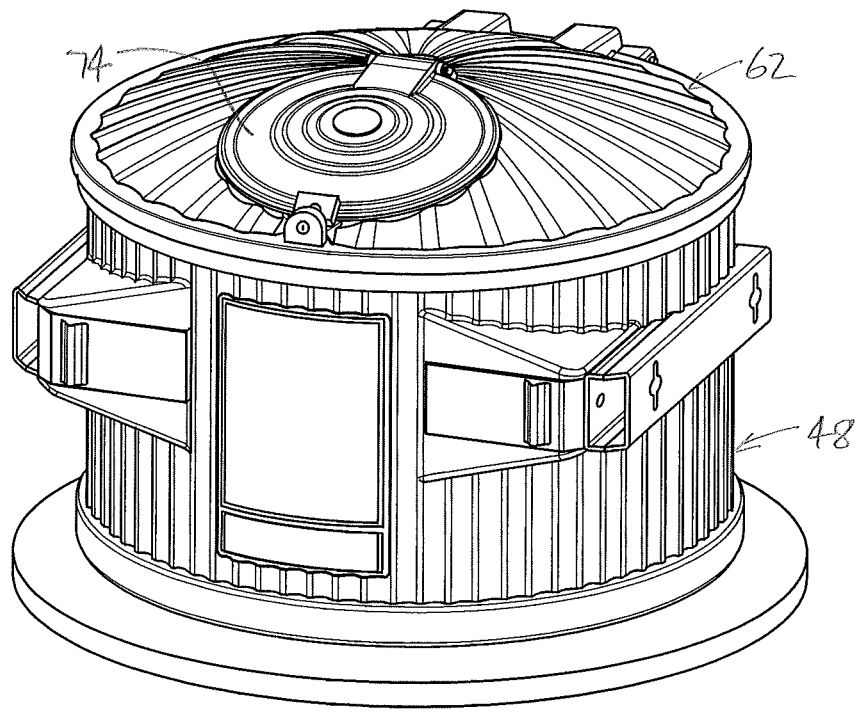
FIG. 11 is an isometric view of a head portion of an embodiment of the main receptacle body of the invention with the lid subassembly of FIG. 1A thereon, with the main receptacle body in the received condition.
Figure 12:
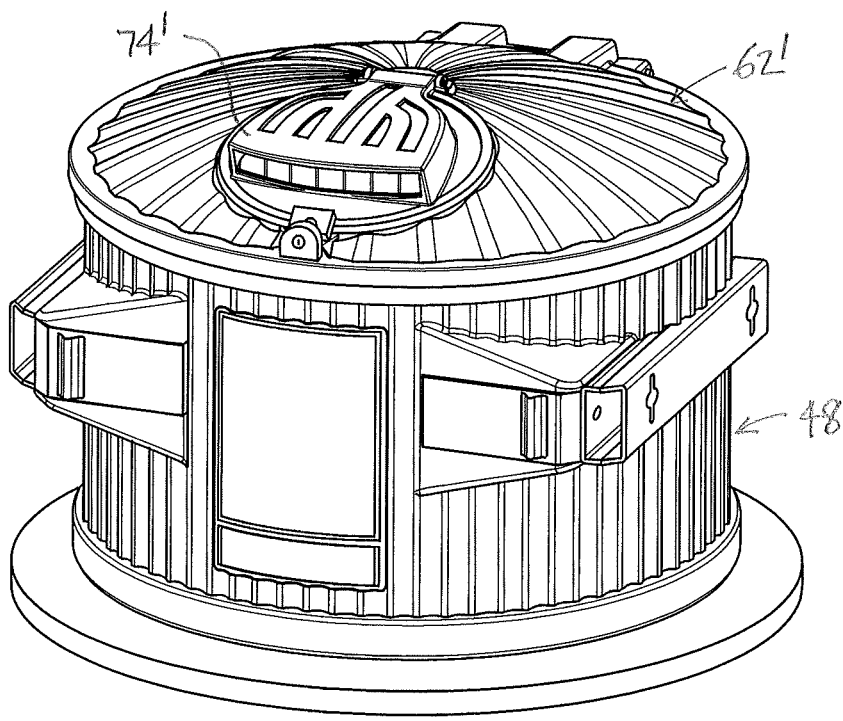
FIG. 12 is an isometric view of the head portion of the main receptacle body of FIG. 11 with the lid subassembly of FIG. 1B thereon, with the main receptacle body in the received condition.

In another embodiment, the collar element 76 preferably is precast concrete. An example is provided in FIGS. 1A and 1B, where the collar element illustrated is a precast concrete element. As can be seen in FIG. 10, the precast concrete collar element 76 preferably is in the form of a ring that is positioned on the well liner 32 (FIG. 1A), after the well liner 32 is installed.

Figure 1B:
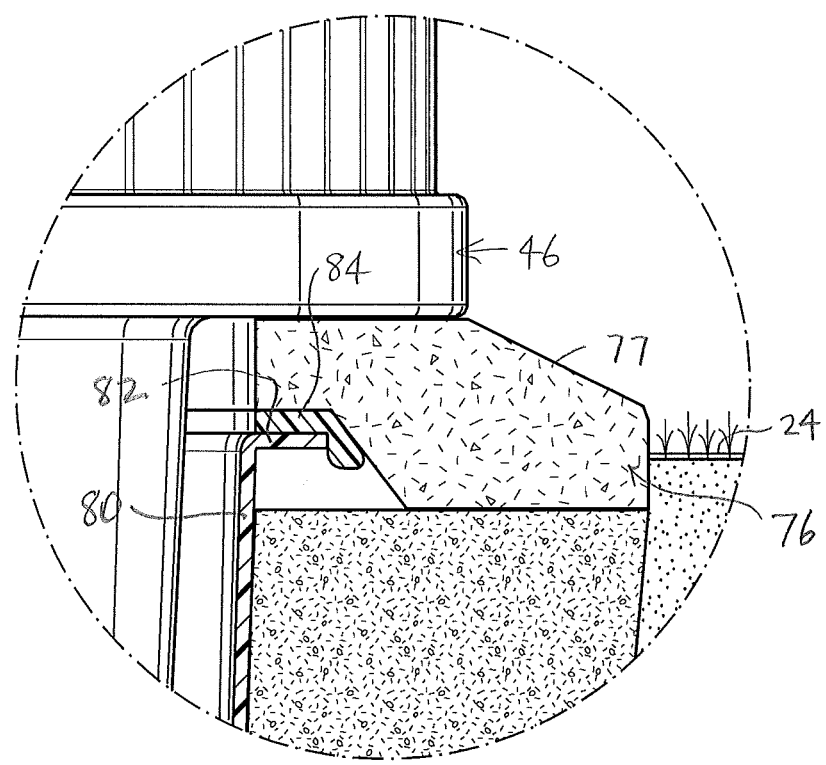
FIG. 1B is a portion of the system of FIG. 1A, drawn at a larger scale.
Figure 1D:
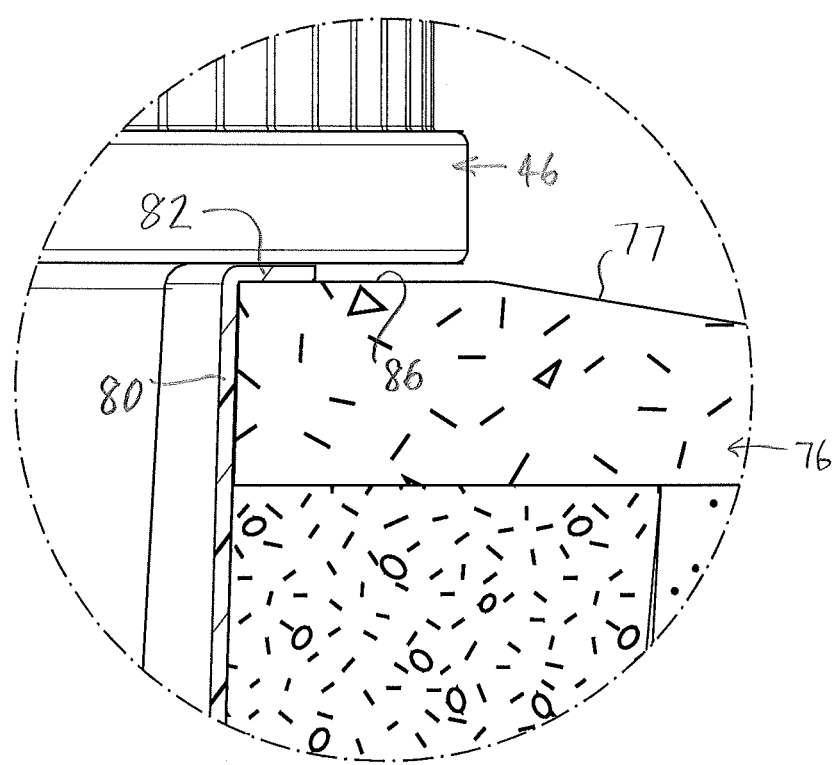
FIG. 1D is a portion of the system of FIG. 1C, drawn at a larger scale.

Preferably, and as can be seen in FIGS. 1B and 1D, the collar element 76 includes a sloped portion 77 for at least partially directing liquid positioned thereon substantially away from the well 30. Those skilled in the art would appreciate that the sloped portion 77 preferably is formed so that it has a suitable slope relative to the horizontal when the collar element 76 is in place. For instance, when the collar element is formed on site (FIGS. 1C, 1D), the sloped portion 77 preferably is located at substantially 3° relative to the horizontal. However, as can be seen in FIGS. 1A and 1B, the sloped portion 77 of the precast collar element 76 preferably is somewhat steeper, e.g., about 25° relative to the horizontal when installed.

As can be seen in FIGS. 1A, 5A, and 5B, the body 34 of the well liner 32 preferably includes a floor portion 78 positioned at the bottom end 38, and a wall element 80 extending from the floor portion 78 to the top end 36 of the well liner body 34. Preferably, and as will be described, the wall element 80 at least partially defines the well wall 28.

It is also preferred that the body 34 includes one or more flanges 82 located at the top end 36 and positioned substantially transverse to the wall element 80. In one embodiment, and as can be seen in FIG. 1B, the well assembly 22 preferably also includes a gasket 84 positionable between the flange 82 and the collar element 76, to at least partially impede flow of the liquid into the well 30. The gasket 84 preferably is made of any suitable material. In one embodiment, the gasket 84 preferably is made of a suitable rubber material, and is approximately 3 inches (7.62 cm) thick. It has been found to be suitable if the precast concrete element 76 is approximately 6 inches (15.24 cm) thick.

As can be seen in FIGS. 1A and 1B, when the collar element 76 is made of precast concrete, it is preferred that the collar element 76 at least partially supports the head portion 48. In effect, the collar element 76 positions the lower end 56 of the main barrel portion 46 in the preselected position in the liner cavity 40, when the main receptacle body 44 is in the received condition. Preferably, when the main barrel portion 46 is in the preselected position, the lower end 56 of the wall 52 of the main barrel portion 46 is located either on or a relatively small distance (e.g., approximately two inches (approximately 5.08 cm)) above the floor portion 78 of the well liner body 34. However, it will be understood that, as will be described, the well assembly may be configured so that the lower end 56 of the wall 52 of the main barrel portion 48 may rest upon, and be supported by, the floor portion 78. In practice, it is difficult to achieve the desired positioning of the main barrel portion (i.e., resting upon the floor portion) when the collar element 76 is precast.

Another embodiment of the waste collection system 20 of the invention is illustrated in FIGS. 1C and 1D, in which the collar element 76 is produced by pouring concrete on site. In this embodiment, the poured concrete is first allowed to cure, as is well known in the art. Preferably, and as can be seen in FIG. 1D, the flange 82 is positionable on an upper surface 86 of the collar element 76 to locate the main receptacle body 44 in the predetermined position in the liner cavity 40 when the main receptacle body is in the received condition. As can be seen in FIG. 1C, when the main receptacle body 44 is in the predetermined position, the lower end 56 preferably is located so that it is engaged with, and supported by, the floor portion 78 of the well liner body 34. This arrangement is preferred to the predetermined position (illustrated in FIG. 1A) because locating the main receptacle body 44 so that it is suspended (i.e., rather than supported, by the floor portion), subjects the main receptacle body to stresses.

In one embodiment, the base 26 includes one or more securing elements 88 (FIGS. 1A, 1C) for securing the well liner 32 to the base 26. Those skilled in the art would appreciate that various types of securing elements may be employed, in various arrangements. As will be described, in one embodiment, it is preferred that the securing elements are rebar elements. As can be seen in FIGS. 5A and 5B, the well liner 32 preferably also includes one or more foot elements 90 (FIGS. 1A, 1C) positioned on an exterior surface 92 of the floor portion 78. Each foot element preferably includes one or more holes in which the securing element 88 is positionable, to secure the well liner 32 to the base 26.

As can be seen in FIGS. 5A and 5B, in one embodiment, the well liner 32 preferably includes three foot elements, identified for convenience in FIG. 5B by the reference numerals 90A, 90B, and 90C respectively. It will be understood that only the holes (identified in FIG. 5A for convenience as 94A-C, 94B-C, and 94C-C) in the foot element 90C are shown. It will be understood that each of the foot elements 90 as illustrated preferably includes three holes, and that the three holes in each foot element are substantially aligned with the three holes in the other foot elements. However, to simplify the illustrations, only the holes identified in FIG. 5A as 94A-C, 94B-C, and 94C-C are shown.

In one embodiment, the base 26 preferably includes a layer or footing (identified as "$L_1$" in FIGS. 1A and 1C) of concrete. The layer "$L_1$" preferably has a thickness "T" that is any suitable thickness. For instance, it has been found that a thickness of approximately 12 inches (approximately 30.48 cm) is a suitable thickness. In order to secure the well liner 32 in the well 30, the foot elements 90 preferably are positioned in the layer "$L_1$" of the base 26 before the concrete has cured. For instance, in one embodiment, it is preferred that, first, the securing elements 88 are positioned in the holes 94 in the foot elements 90. Preferably, the securing elements 88 are rebar having a diameter of approximately 0.75 inch (approximately 1.9 cm). Before the concrete used to form the layer "$L_1$" is poured, the foot elements 90, with the rebar elements 88 inserted through the holes 94 therein, are positioned below the intended location of a top surface "S" of the layer "$L_1$" (FIGS. 1A, 1C). Next, the concrete to form the base 26 is poured. As is well known in the art, when poured, the concrete envelopes the parts of the rebar elements 88 that extend beyond the foot elements 90, and the poured concrete also envelopes the foot elements 90. Once the concrete in the base 26 has cured, the concrete of the base 26 serves to hold the exposed parts of the rebar elements 88 in place, thereby securing the well liner 32 to the layer "$L_1$" of the base 26. It will be understood that, although there are three rebar elements 88 installed through the three foot elements 90, only one of the rebar elements is illustrated in FIGS. 1A and 1C due to the manner in which the invention is illustrated in those views. The two other rebar elements are omitted for clarity of illustration.

The well liner 32 preferably is secured to the base 26 as described above to provide a number of advantages. It is believed to be important that the well liner 32 be secured to the base 26 because the well liner 32 holds the aggregate in the well wall 28 in position. In addition, the well liner 32 is not movable by water that does not drain immediately from the well 30. For example, after heavy rainfall, water may not drain from the well area immediately. In a location with a high water table, securing the well liner 32 to the base 26 keeps the well liner 32 in its appropriate position. Also, when the main receptacle body 44 is lifted to move it out of the liner cavity 40 prior to dumping, the main barrel portion 46 may bind to or otherwise adhere to the well liner 32, and this would otherwise tend to move the well liner 32, if the well liner 32 were not secured to the base 26.

The well assembly 22 preferably is assembled as follows. Initially, the suitability of a proposed location of the well assembly 22 preferably is assessed. Those skilled in the art would be aware of the need to have adequate drainage from the proposed location, and also of the need to consider whether there is sufficient space around the proposed location for a garbage truck to operate, once the waste receptacle system is installed. Preferably, a soil survey is conducted at the location, to determine whether the pre-existing soil conditions are acceptable, and also there is a check for other pre-existing in-ground obstacles, e.g., underground wires, cables, or pipes.

If the proposed location is suitable, then a hole (not shown) is excavated. The hole is sufficiently large to accommodate the base 26. In one embodiment, the base 26 preferably includes a layer "$L_2$" of relatively large diameter gravel on which the concrete footing "$L_1$" is positioned. Those skilled in the art would be aware of suitably sized gravel. For example, in one embodiment, the gravel in the layer "$L_2$" preferably has a nominal minimum diameter of approximately 0.75 inch (approximately 1.9 cm.). It is also preferred that the layer "$L_2$" is approximately 12 inches (approximately 30.48 cm) thick.

After the layer "$L_2$" of coarse gravel is installed, the well liner 32 is positioned in the excavated hole, with the rebar elements 88 positioned in the holes 94 of the foot elements 90, as described above. Also as described above, the concrete to form the footing "$L_1$" is then poured and allowed to cure. It is preferred that the well liner 32, once installed, is substantially level, i.e., so that the floor portion 78 is positioned substantially horizontal.

Once the base 26 has been completed, the well wall 28 is formed. Preferably, the well wall 28 is formed in a series of layers. As can be seen in FIGS. 1A and 1C, it is preferred that the well wall 28 includes an outer, surrounding band of soil 97. Preferably, the soil 97 is found in the location, e.g., the soil 97 may have been excavated to form the hole, and subsequently backfilled. It is preferred that the reference surface 24 is substantially level with the pre-existing upper surface of the ground generally around the location of the waste collection system 20.

After the base 26 is constructed and the well liner 32 is installed, a gravel drainage bed 96 is formed (FIGS. 1A, 1C). The gravel drainage bed 96 preferably is formed of suitably sized gravel, to a suitable thickness. For instance, in one embodiment, the gravel used is approximately 0.75 inch (approximately 1.9 cm) in diameter or more and the gravel drainage bed 96 is approximately 12 inches (approximately 30.48 cm) thick. Preferably, the gravel drainage bed 96 is backfilled against the exterior surface "B" of the well liner 32, and is held in position by the well liner 32. As can be seen in FIGS. 1A and 1C, the gravel drainage bed 96 preferably is positioned on the base 26. In one embodiment, the gravel drainage bed preferably is approximately 12 inches (approximately 30.48 cm) wide.

The gravel drainage bed 96 preferably is located between the well liner 34 and the soil 97. It will be understood that, in practice, the soil 97 and the drainage bed 96 preferably are positioned in their respective locations gradually, i.e., manually, so that the drainage bed 96 is formed, and the soil 97 is positioned, with minimal mixture therebetween.

In one embodiment, and as can also be seen in FIGS. 1A and 1C, a layer 99 of mixed sand and gravel is installed on top of the gravel drainage bed 96. The layer 99 preferably consists of any suitable material. It has been found that "A" gravel (i.e., a typical foundation backfill material, as would be known by those skilled in the art) is a suitable material. It is also preferred that the sand and gravel material is placed in the layer 99 in a series of lifts, each such lift being about 12 inches (about 30.48 cm) in thickness. After each lift is put into position, it is compacted, using a compactor. This method has the benefit of providing a column of relatively well-compacted material which, due to the compacting of each successive lift as indicated above, is likely to be relatively stable. Also, because the layer 99 is built up by the successive lifts, the soil 97 can be positioned outside the layer 99 as each lift is positioned, so that the soil 97 and the sand and gravel mixture are kept generally separated from each other in situ.

Preferably, the width of the sand and gravel mixture 99 is about 12 inches (30.48 cm). Those skilled in the art would appreciate that, when the well assembly 22 is constructed, the sand and gravel mixture 99 and the soil 97 above the drainage bed 96 preferably are put into position gradually (i.e., in a succession of relatively thin layers), so as to minimize intermingling of the soil 97 and the sand and gravel mixture 99. The sand and gravel mixture 99 provides support to the soil 97 and to the well body 32, and also permits drainage of water from the well 30.

As can be seen in FIGS. 1A and 1C, it is preferred that the well assembly 22 is constructed so that, when the main receptacle body 44 is in the received condition, a large proportion of the main receptacle body 44 is positioned below the reference surface 24. For instance, where the cavity 51 is approximately seven cubic yards, approximately 42 per cent of the main receptacle body's length is positioned below the reference surface, when the main receptacle body is in the received condition. In one embodiment, when the main receptacle body is in the received condition, the aperture is approximately 55 inches above the reference surface, and therefore readily accessible. Because of the position of a large proportion of the main receptacle body below the reference surface, the waste therein is kept relatively cool, i.e., during warm weather. This has the benefit that the decomposition of the waste collected is somewhat slowed, and fewer odours are generated thereby.

As indicated above, where the cover 74 is pivotally connected to the lid body 71 (e.g., as illustrated in FIGS. 1A, 2A, 2B, 2D, 3A, and 6A-7B), the cover 74 preferably is securable to the lid body 71 by a conventional lock. In use, the user (not shown), after unlocking the lock, opens the cover 74, to enable the user to drop waste through the aperture 72 in the lid body 71, and thus into the liner cavity 51. Those skilled in the art would appreciate that the waste may be in any suitable form, e.g., inside conventional garbage bags.

Because most of the main receptacle body 44 is installed below the reference surface 24, the aperture 72 is accessible by those who are relatively short without any requirement for a ladder or steps. From the foregoing, it can be seen that, because the waste collection system is secured, a structure around the waste collection system such as a dumpster "corral" is unnecessary.

Those skilled in the art would appreciate that, in one embodiment, the main receptacle body 44 preferably is (i) moved from the received condition to the removed condition, and (ii) at least partially inverted, to empty the main receptacle body 44 of the waste therein, by the moving device 50, which preferably is conventional front-end-loading waste disposal truck. As described above, the head portion 48 preferably includes the sleeves 65, 66 in which the forks 68, 70 of the front-end-loading waste disposal truck 50 are receivable, in conventional fashion. The front-end-loading waste disposal truck is thus able to raise the main receptacle body 44 out of the well 30, at least partially invert the main receptacle body 44 (i.e., to empty the waste therein into the truck), and subsequently to move the main receptacle body 44 back to the received condition (i.e., to lower at least part of the main barrel portion into the well 30). Because the movement of a waste receptacle held by the forks of a front-end-loading waste disposal truck to result in the at least partial inversion of the main receptacle body 44 while it is in the removed condition is well known in the art, it is unnecessary to discuss such movement in detail. As noted above, when the main receptacle body is at least partially inverted, the gravity lock opens, enabling the lid body 71 to pivot on the hinge 63, so that the waste can exit the cavity 51 via the opening. Also, when the main receptacle body 44 is positioned upright, the gravity lock locks, securing the lid closed. The upright main receptacle body 44 is then substantially aligned with the well 30, and the main barrel portion 46 is at least partially lowered into the well liner, as described above.

Preferably, the aperture 72 is sized to permit an object having two dimensions no greater than predetermined dimensions to pass therethrough. In one embodiment, the aperture 72 preferably is sufficiently large that a filled standard waste disposal bag may pass through the aperture 72. As described above, the lid body 71 preferably is normally secured to the main receptacle body 44, when the main receptacle body 44 is in the received condition. In this way, unauthorized use of the system 20 is prevented. In particular, dumping oversized objects into the cavity 51 of the main receptacle body 44 is prevented.

From the foregoing, it can be seen that the well assembly 22 preferably includes a number of components that, taken together, provide effective drainage and a securely anchored, stable well liner 32. The well wall 28 is formed to permit drainage of water away from the exterior of the well liner 32.

Figure 9A:
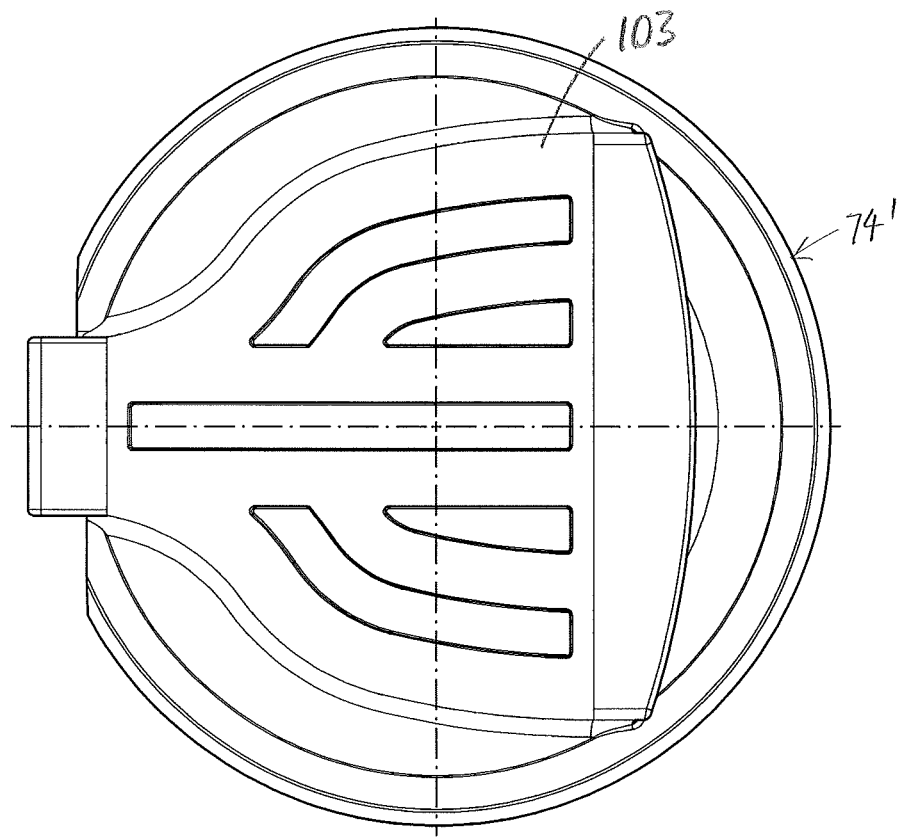
FIG. 9A is a top view of a cover of the lid subassembly of FIGS. 8A and 8B, drawn at a larger scale.
Figure 9B:
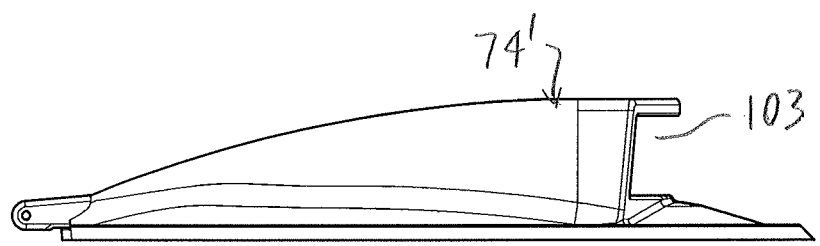
FIG. 9B is a side view of the cover of FIG. 9A.

As described above, and as can be seen in FIG. 1A, an embodiment of the lid subassembly 62 preferably includes the cover 74, pivotally connected to the lid body 71 by a hinge 101 (FIG. 2D), so that the cover 74 is pivotable to an open position, in which the aperture 72 is uncovered. In another embodiment, illustrated in FIG. 1C, the lid subassembly 62' preferably includes a cover 74' fixed in position over the aperture 72. The cover 74' includes a relatively narrow slot 103 (FIGS. 1C, 9B) therein for access to the cavity 51, via the aperture 72. The cover 74' is intended to permit only certain materials to be pushed through the slot 103 and thus deposited into the cavity 51. Preferably, the slot 103 is sized to receive recyclable materials, e.g., paper, or cardboard. In one embodiment, the slot 103 is approximately four inches (approximately 10.16 cm) high and approximately 30 inches (approximately 76.2 cm) wide. It will be understood that, in this embodiment, the lid body 71' preferably is secured to the head portion 48 by the gravity lock when the main receptacle body 44 is in the upright position.

As described above, the waste collection system 20 is designed for use with conventional front-end-loading garbage trucks. However, it may be that a conventional front-end-loading garbage truck is not available when collected waste is to be emptied out of the cavity 51. Preferably, the head portion 48 is formed for use with an alternative type of moving device, to address this possibility.

As can be seen in FIGS. 2A and 2B, in one embodiment, the head portion 48 includes one or more connector openings 105 in which one or more connector elements 107 attached to the moving device (not shown in FIGS. 2A, 2B) are positionable, to secure the connector element 107 to the head portion 48 at the connector opening 105, for permitting the moving device to move the main receptacle body 44 between the received condition and the removed condition. As can be seen in FIGS. 2A and 2B, it is preferred that the connector openings 105 are formed in the sleeves 65, 66. (It will be understood that only the sleeve 66 and the connector openings 105 formed therein are shown in FIGS. 2A and 2B for clarity of illustration, and the sleeve 65 includes connector openings therein corresponding to the connector openings 105 illustrated in FIGS. 2A and 2B.)

As can be seen in FIG. 2A, each connector opening 105 preferably includes a first hole 109 and a smaller second slot 111. The first hole 109 and the second slot 111 are in communication with each other.

Those skilled in the art would appreciate that a link in a chain may be inserted into the first hole 109 and then rotated, and slid edgewise into the second slot 111. The link is held securely in the slot 111 as long as the link is subjected to an upwardly-directed tension that forces the link into the second slot 111.

From the foregoing, it can be seen that one or more chains may be used as the connector elements 107. Preferably, the chains 107 are suitably suspended from the moving device (not shown) to provide sufficient chains 107 to lift the main receptacle body substantially directly upwardly, i.e., to move the main receptacle body 44 from the received condition to the removed condition. For example, the moving device may be a relatively large front-end loader, and the chains may be suspended from its raised bucket. In FIG. 2B, two connector elements 107 are shown attached to the head portion 48 via front and rear connector openings 105. (It will be understood that two corresponding connector elements 107 are connected at the front and rear connector openings (not shown) on the side of the head portion not viewable, i.e., in the sleeve 65.)

Once the main receptacle body 44 has been lifted so that the main barrel portion 46 is out of the well liner cavity 40, the main receptacle body 44 is required to be at least partially inverted (as described above), in order to empty the waste collected in the cavity 51. Accordingly, in one embodiment, the waste collection system 20 preferably also includes a tip bar 113 (FIGS. 3A, 3B) mounted at the lower end 56 of the main barrel portion 46 for engagement with an engagement element 115 attached to the moving device, for substantially emptying the waste in the cavity 51 therefrom As can be seen in FIGS. 3B and 4D, in one embodiment, the main barrel portion 46 preferably includes a recess 117 (FIGS. 3B, 4C, and 4D) in which the tip bar 113 is mounted. It is preferred that the tip bar 113 is held in position in the recess 117 by two brackets 119A, 119B that are secured to the main barrel portion 46 by suitable fasteners 121. The tip bar 113 is for providing an alternative means for at least partially inverting the main receptacle body 44.

Once the main receptacle body 44 is in the removed condition and suspended above a selected location where the collected waste is to be dumped, another moving device (e.g., another loader or excavator) preferably is used to at least partially invert the main receptacle body 44. As can be seen in FIG. 3B, the other equipment preferably is temporarily connected to the tip bar 113 via the engagement element 115 (e.g., a hook) on a chain or suitable cable 123 suspended from the other equipment, and in this way the main receptacle body 44 is at least partially inverted when the other equipment pulls the tip bar 113 upwardly, to the extent necessary.

After the collected waste has been emptied out, the main receptacle body 44 is returned to a substantially upright position, and the engagement element 115 is disengaged from the tip bar 113. With the emptied main receptacle body suspended from the moving device by the connector elements 107 (i.e., as illustrated in FIG. 2B), the main barrel portion 46 is lowered into the liner cavity 40, until the main receptacle body 44 is in the received condition.

Figure 6A:
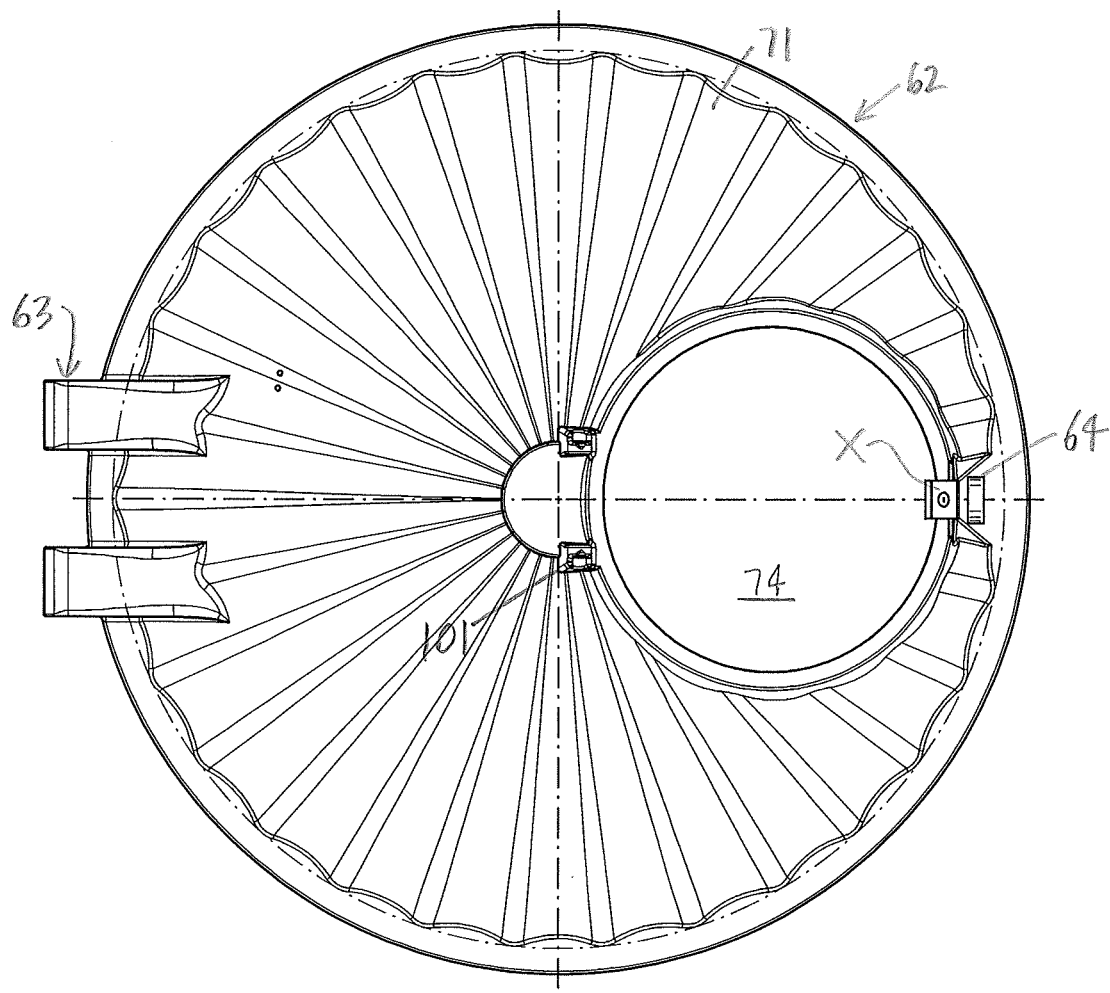
FIG. 6A is a top view of the lid subassembly with a cover thereof removed, drawn at a larger scale.
Figure 6B:
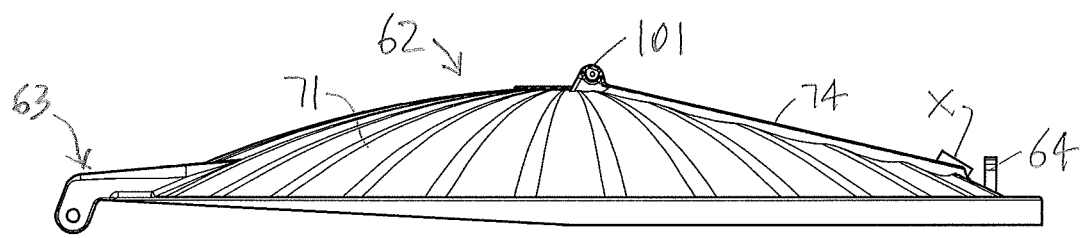
FIG. 6B is a side view of the lid subassembly of FIG. 6A.
Figure 7A:
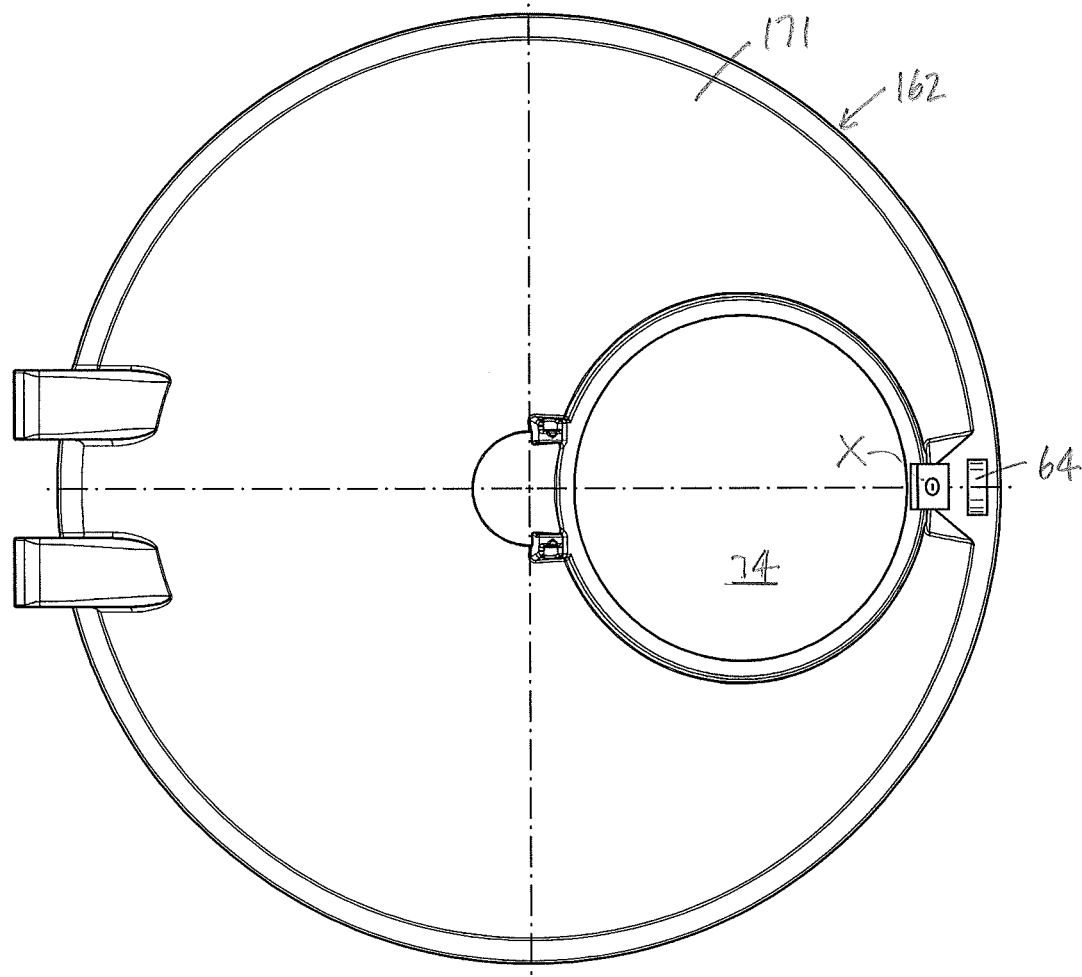
FIG. 7A is a top view of another embodiment of a lid subassembly of the invention with a cover thereof removed.
Figure 7B:
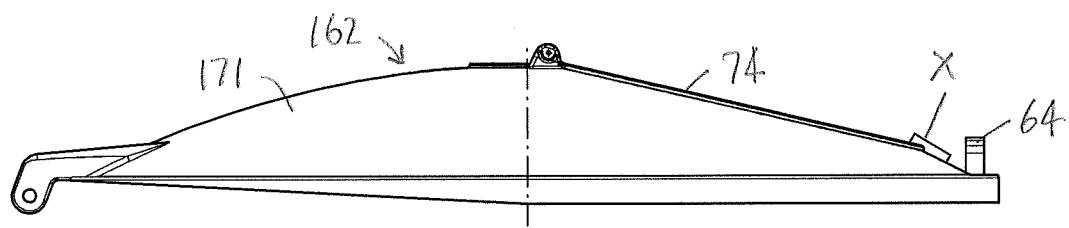
FIG. 7B is a side view of the lid subassembly of FIG. 7A.
Figure 8A:
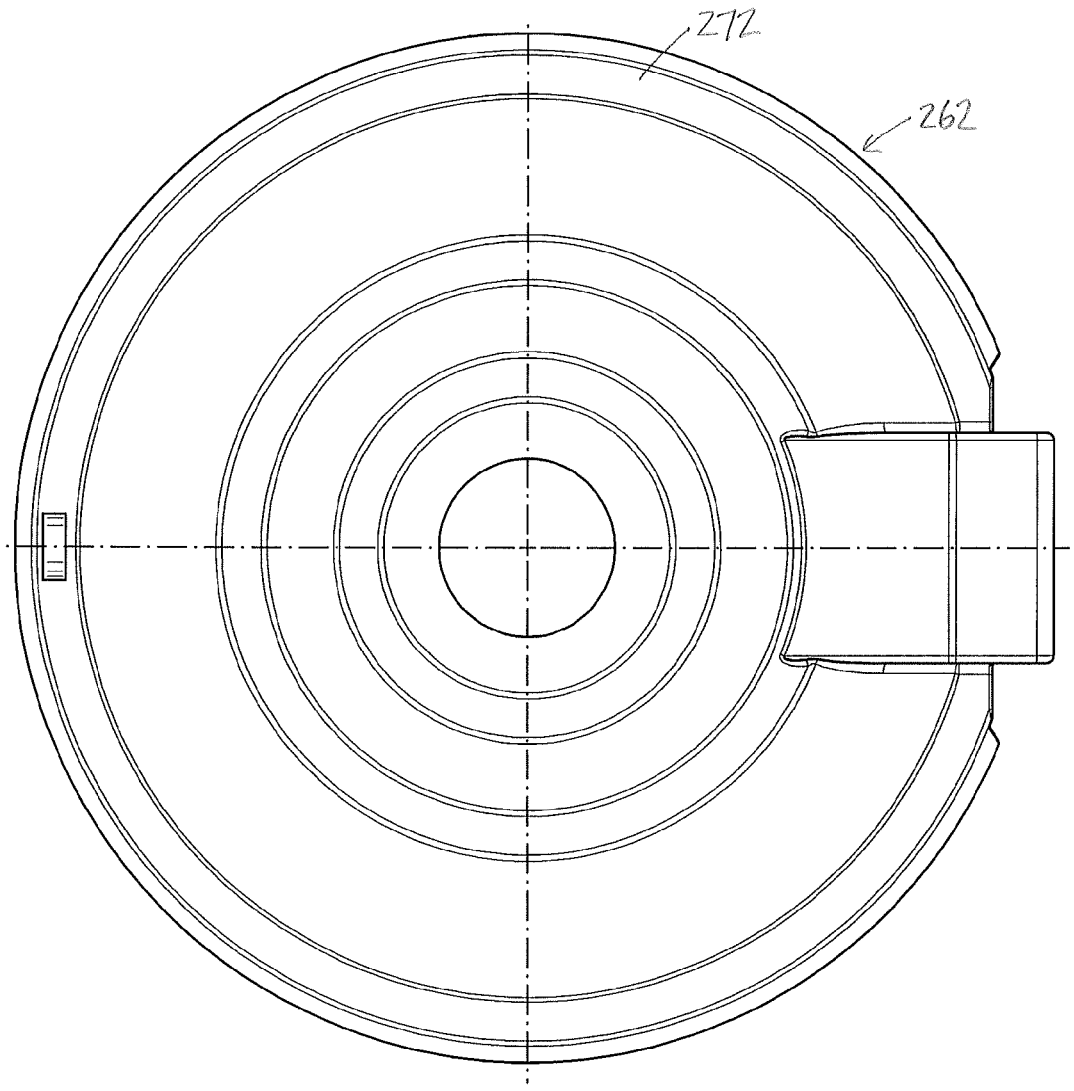
FIG. 8A is a top view of another embodiment of the lid subassembly of the invention.
Figure 8B:
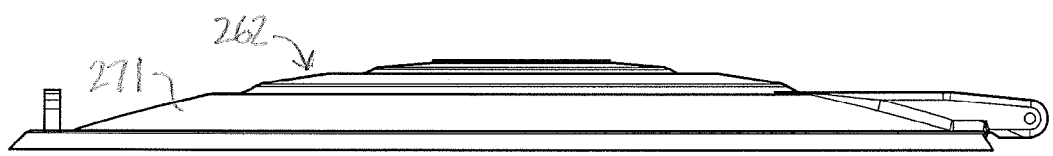
FIG. 8B is a side view of the lid subassembly of FIG. 8A.

As can be seen, for example, in FIGS. 6A and 6B, in one embodiment, the lid body 71 preferably is ribbed, for added strength. An alternative embodiment of a lid subassembly 162 is shown in FIGS. 7A and 7B. In this embodiment, a lid body 171 of the lid subassembly 162 thereof is generally smooth, i.e., not ribbed. In an alternative embodiment of a lid subassembly 262 (FIGS. 8A, 8B), the lid subassembly 262 preferably includes a lid body 271. It is preferred that the lid body 271 does not include an aperture therein. In order to access the cavity 51 directly, the user opens the lid body 271 by unlocking the lid body from the waste receptacle body.

It will be appreciated by those skilled in the art that the invention can take many forms, and that such forms are within the scope of the invention as described above. The scope of the claims should not be limited to the preferred embodiments set forth in the examples, but should be given the broadest interpretation consistent with the description as a whole.

I claim:

1. A waste collection system comprising:
   a well assembly positioned at least partially below a reference surface, the well assembly comprising:
     a base;
     a well wall at least partially positioned on the base;
     the base and the well wall at least partially defining a well, the well wall being at least partially permeable to permit liquid collected in the well to drain therefrom through the well wall;
     a well liner at least partially receivable in the well, the well liner comprising at least one body extending between top and bottom ends thereof, said at least one body defining a liner cavity therein in communication with a top opening at the top end;
   a main receptacle body comprising a main barrel portion and a head portion, the main receptacle body being at least partially receivable in the liner cavity;
   the main receptacle body being movable by at least one moving device between a received condition, in which the main barrel portion is at least partially received in the liner cavity, and a removed condition, in which the main barrel portion is located outside the liner cavity; and
   the main receptacle body defining a cavity therein in which waste is receivable.

2. A waste collection system according to claim 1 in which the main barrel portion comprises at least one wall extending between upper and lower ends thereof and defining a lower part of the cavity therein.

3. A waste collection system according to claim 2 in which:
   the head portion defines an opening at a top end thereof in communication with the cavity; and
   the main receptacle body additionally comprises a lid subassembly positionable to cover the opening, to provide controllable access to the opening.

4. A waste collection system according to claim 1 in which the head portion additionally comprises a pair of sleeves located thereon, the pair of said sleeves being positioned for receiving therein forks mounted on said at least one moving device when the main receptacle body is in the received condition, to permit the main receptacle body to be moved between the received condition and the removed condition by said at least one moving device.

5. A waste collection system according to claim 3 in which the lid subassembly comprises:
 a lid body with an aperture therein to permit ingress into the cavity via the opening in the main barrel portion, when the main receptacle body is in the received condition;
 the aperture being sized to permit objects having up to preselected maximum dimensions therethrough; and
 a cover for covering the aperture.

6. A waste collection system according to claim 1 in which the well assembly additionally comprises at least one collar element for positioning the main barrel portion in a predetermined position at least partially in the liner cavity when the main receptacle body is in the received condition.

7. A waste collection system according to claim 6 in which said at least one body of the well liner comprises:
 a floor portion positioned at the bottom end; and
 a wall element extending from the floor portion to the top end.

8. A waste collection system according to claim 7 in which:
 said at least one body comprises at least one flange located at the top end and positioned substantially transverse to the wall element; and
 the well assembly additionally comprises a gasket positionable between the flange and said at least one collar element, to at least partially impede flow of the liquid into the well.

9. A waste collection system according to claim 8 in which said at least one collar element supports the head portion to position the lower end of the main barrel portion in a preselected position in the liner cavity when the main receptacle body is in the received condition.

10. A waste collection system according to claim 7 in which:
 said at least one body comprises at least one flange located at the top end and positioned substantially transverse to the wall element; and
 the flange being positionable on an upper surface of said at least one collar element to locate the main receptacle body in the predetermined position in the liner cavity when the main receptacle body is in the received condition.

11. A waste collection system according to claim 6 in which said at least one collar element comprises a sloped portion for at least partially directing liquid positioned thereon substantially away from the well.

12. A waste collection system according to claim 6 in which said at least one collar element is precast concrete.

13. A waste collection system according to claim 6 in which said at least one collar element is formed of concrete poured on site.

14. A waste collection system according to claim 7 in which:
 the base includes at least one securing element for securing the well liner to the base;
 the well liner additionally comprises:
  at least one foot element positioned on an exterior surface of the floor portion;
  said at least one foot element comprising at least one hole in which said at least one securing element is positionable, to secure the well liner to the base.

15. A waste collection system according to claim 1 in which the head portion comprises at least one connector opening in which at least one connector element attached to said at least one moving device is positionable, to secure said at least one connector element to the head portion at said at least one connector opening, for permitting said at least one moving device to move the main receptacle body between the received condition and the removed condition.

16. A waste collection system according to claim 15 additionally comprising a tip bar mounted at the lower end of the main barrel portion for engagement with an engagement element attached to said at least one moving device, for substantially emptying the waste in the cavity therefrom.

17. A well assembly for at least partially receiving a main barrel portion of a main receptacle body in which waste is collectable for disposal therefrom, the well assembly comprising:
 a base;
 a well wall comprising at least one material that is at least partially permeable, for drainage therethrough;
 the well wall and the base at least partially defining a well in which the main barrel portion is at least partially receivable;
 a well liner at least partially receivable in the well;
 the well liner comprising at least one body extending between top and bottom ends thereof defining a liner cavity therein in communication with a top opening at the top end; and
 the liner cavity being formed to at least partially receive the main barrel portion.

18. A well assembly according to claim 17 additionally comprising at least one collar element for positioning the main barrel portion in a predetermined position at least partially in the liner cavity.

19. A well assembly according to claim 18 in which said at least one collar element comprises a sloped portion for at least partially directing liquid positioned thereon substantially away from the well.

20. A well assembly according to claim 18 in which said at least one body of the well liner comprises:
 a floor portion positioned at the bottom end; and
 a wall element extending from the floor portion to the top end.

21. A well assembly according to claim 20 in which:
 said at least one body of the well liner comprises at least one flange located at the top end and positioned substantially transverse to the wall element; and
 the well assembly additionally comprises a gasket positionable between the flange and said at least one collar element, to at least partially impede flow of the liquid into the well.

22. A well assembly according to claim 20 in which:
 said at least one body of the well liner comprises at least one flange located at the top end and positioned substantially transverse to the wall element; and
 said at least one flange being positionable on an upper surface of said at least one collar element to locate the main receptacle body in the predetermined position in the liner cavity when the main receptacle body is in the received condition.

23. A well assembly according to claim 22 in which:
 the base includes at least one securing element for securing the well liner to the base;
 the well liner additionally comprises:
  at least one foot element positioned on an exterior surface of the floor portion; and
  said at least one foot element comprising at least one hole in which said at least one securing element is positionable, to secure the well liner to the base.

24. A well assembly according to claim 18 in which said at least one collar element supports the head portion to position the lower end of the main barrel portion in a preselected position at least partially in the liner cavity.

25. A well assembly according to claim 22 in which said at least one flange of said at least one body of the well liner is positioned on said at least one collar element.

\* \* \* \* \*